United States Patent

Suzuki

[11] Patent Number: 5,957,246
[45] Date of Patent: Sep. 28, 1999

[54] ELECTRIC BRAKE INCLUDING A PAD CLEARANCE ADJUSTING MECHANISM AND A METHOD FOR ADJUSTING THE PAD CLEARANCE OF THE SAME

[75] Inventor: Yoshihiko Suzuki, Saitama, Japan

[73] Assignee: Akebono Brake Industry Co., Ltd., Tokyo, Japan

[21] Appl. No.: 08/998,029

[22] Filed: Dec. 24, 1997

[30] Foreign Application Priority Data

Dec. 26, 1996 [JP] Japan ...................................... 8-347549

[51] Int. Cl.$^6$ .............................. B60T 13/74; B60T 13/58
[52] U.S. Cl. ..................................... 188/72.1; 188/1.11 L; 188/181 T; 188/71.8; 188/158; 188/196 R; 188/162; 303/20; 303/112; 303/155; 303/3
[58] Field of Search .................................. 188/71.8, 71.9, 188/162, 72.1, 156, 158, 181 T, 161, 72.8, 72.7, 196 R, 1.11 L, 71.1, 79.51; 303/115.2, 162, 112, 155, 3, 9.61, 20; 318/376

[56] References Cited

U.S. PATENT DOCUMENTS

| | | | |
|---|---|---|---|
| 4,006,801 | 2/1977 | Bayliss | 188/162 |
| 4,175,645 | 11/1979 | Brinkert | 188/71.9 |
| 4,327,414 | 4/1982 | Klein . | |
| 4,602,702 | 7/1986 | Ohta et al. | 188/72.1 |
| 4,804,073 | 2/1989 | Taig et al. | 188/72.1 |
| 4,809,824 | 3/1989 | Fargier et al. | 188/72.8 |
| 4,850,457 | 7/1989 | Taig | 188/72.1 |
| 4,854,424 | 8/1989 | Yamatoh et al. | 188/72.1 |
| 4,860,859 | 8/1989 | Yamatoh et al. | 188/156 |
| 4,941,553 | 7/1990 | Harrison | 188/156 |
| 5,090,518 | 2/1992 | Schenk et al. | 188/72.1 |
| 5,107,967 | 4/1992 | Fujita et al. | 188/72.1 |
| 5,150,773 | 9/1992 | Hickey et al. | 188/162 |
| 5,302,008 | 4/1994 | Miyake et al. | 188/156 |
| 5,348,123 | 9/1994 | Takahashi et al. | 188/72.1 |
| 5,366,280 | 11/1994 | Littlejohn | 303/3 |
| 5,390,992 | 2/1995 | Walenty et al. | 303/112 |
| 5,403,072 | 4/1995 | Kilian et al. | 188/1.11 L |
| 5,468,058 | 11/1995 | Linkner, Jr. | 303/115.2 |
| 5,470,134 | 11/1995 | Toepfer et al. | 188/1.11 L |
| 5,628,387 | 5/1997 | Schantzen | 188/72.8 |
| 5,645,143 | 7/1997 | Mohr et al. | 188/72.1 |
| 5,782,322 | 7/1998 | Hauck et al. | 188/72.1 |
| 5,785,157 | 7/1998 | Scott et al. | 188/156 |
| 5,788,341 | 8/1998 | Penrod et al. | 303/115.2 |
| 5,826,683 | 10/1998 | Murata et al. | 188/72.1 |
| 5,829,557 | 11/1998 | Halasy-Wimmern et al. | 188/72.1 |
| 5,848,672 | 12/1998 | Brearley et al. | 188/1.11 L |

*Primary Examiner*—Douglas C. Butler
*Attorney, Agent, or Firm*—Morgan, Lewis & Bockius LLP

[57] ABSTRACT

The electric brake including a pad clearance adjusting mechanism comprises: ignition switch detecting member for detecting that an ignition key has been switched from its off position to its on position; brake instruction detecting member; a parking brake detecting member; a brake control device; a piston position sensor; and, an electric actuator. In the brake control device, if the ignition switch detecting member detects that the ignition key has been switched from its off position to its on position, then actuates the electric actuator to thereby cause the present electric brake to generate a slight brake torque, the current position of a piston is set as the initial position of the piston, a position to which the piston is moved back from the initial position by an amount corresponding to a previously set pad clearance is set as the adjusted position of the piston, after then, if a brake instruction is issued by operating a brake pedal, then the electric brake can be operated and, if the brake instruction is retracted, then the electric actuator can be driven to thereby move the piston back to the piston adjusted position, thereby being able to obtain a constant pad clearance.

7 Claims, 3 Drawing Sheets

5,957,246

ELECTRIC BRAKE INCLUDING A PAD CLEARANCE ADJUSTING MECHANISM AND A METHOD FOR ADJUSTING THE PAD CLEARANCE OF THE SAME

BACKGROUND OF THE INVENTION

The present invention relates to an electric brake and, in more particular, to an electric brake including a pad clearance adjusting mechanism and a method for adjusting the pad clearance of the present electric brake.

Conventionally, in a hydraulic brake, when a pad is worn, there is executed a pad clearance adjustment in which a hydraulic piston provided in the hydraulic brake is automatically moved back at a given amount by a seal so arranged as to hold the hydraulic piston in a fluid tight manner, a clip or the like, so that the clearance of a friction pad provided in the hydraulic brake can be always kept constant.

On the other hand, in an electric brake which has been developed positively in recent years, since a piston provided therein can be operated only in accordance with an instruction from a control device, a pad clearance adjustment in the electric brake is difficult. This urges the development of a technology which is able to automatically execute the pad clearance adjustment.

Here, as an example of a conventional electric brake, description will be given below of an electric brake which is disclosed in Japanese Patent Publication No. Hei. 3-41233 (corresponding to U.S. Pat. No. 5,107,967). This electric brake comprises: a brake disc which is to be connected to a rotary body to be braked; a friction pad which includes a friction surface located opposed to the side surface of the brake disc and can be moved advancingly and retreatingly; a piston for pressing against the back surface of the friction pad when the friction pad advances; a brake caliper which is mounted on a fixed bracket and supports the piston in such a manner that the piston can be moved reciprocatingly; and, a thrust (driving force) generating device which is provided in the brake caliper and generates a thrust to cause the piston to move advancingly, in which the thrust generating device includes an electric motor, a drive shaft connected to the output shaft of the electric motor, a rotary shaft which can be threadedly engaged with the piston through a ball screw, and a reduction gear which is interposed between the drive and rotary shafts and allows the drive shaft to drive the rotary shaft in such a manner that the rotation speed of the rotary shaft can be reduced as compared with that of the drive shaft, characterized in that, between the piston and caliper, there is interposed a slide bearing which, in a braking operation, is used to receive a side thrust applied to the piston from the friction pad.

However, in the above-structured electric brake, because the piston can be moved only in accordance with a brake instruction from a control device, when the brake pad is worn, it is not possible to automatically adjust the clearance of the brake pad as in the conventionally known hydraulic brake. Due to this, it is difficult that the pad clearance can be always set constant. As a result of this, when the brake pad is worn, there cannot be obtained a stable brake feeling.

SUMMARY OF THE INVENTION

In view of the above, the present invention aims at eliminating the drawbacks found in the above-mentioned conventional electric brake. Accordingly, it is an object of the invention to provide an electric brake which incorporates a control program therein, in particular, into a brake control device provided in the electric brake, the control program being able to automatically adjust the pad clearance when an ignition key is turned from its off position to its on position.

In attaining the above object, according to the invention, there is provided an electric brake including a pad clearance adjusting mechanism. That is, the present electric brake comprises: ignition switch detecting member for detecting that an ignition key has been switched from its off position to its on position; brake instruction detecting member; a parking brake detecting member; a brake control device; a piston position sensor; and, an electric actuator, in which the above-mentioned brake control device, if the ignition switch detecting member detects that the ignition key has been switched from its off position to its on position, then actuates the electric actuator to thereby cause the present electric brake to generate a slight brake torque, the current position of a piston is set as the initial position of the piston, a position to which the piston is moved back from the thus set initial position by an amount corresponding to a previously set pad clearance is set as the adjusted position of the piston, after then, if a brake instruction is issued by operating a brake pedal, then the electric brake can be operated and, if the brake instruction is retracted, then the electric actuator can be driven to thereby move the piston back to the piston adjusted position, thereby being able to obtain a constant pad clearance.

In addition, the above-mentioned object can be attained by an electric brake including a pad clearance adjusting mechanism according to the present invention, the electric brake comprising:

a main body;

a piston movable within the main body for pressing a friction pad;

ignition switch detecting member for detecting that an ignition key has been switched from its off position to its on position;

brake instruction detecting member for detecting an operational condition of a brake pedal;

a parking brake detecting member for detecting an operational condition of a parking brake;

a piston position sensor for detecting a position of the piston within the main body of the electric brake;

an electric actuator for actuating the piston within the main body; and a brake control device for automatically adjusting a pad clearance, wherein the brake control device generates a slight brake torque of the electric brake by operating the electric actuator so as to move the piston onto an initial position, when the ignition switch is turned from its off position to its on position, sets a piston adjusted position of the piston by moving back the piston from the initial position by an amount corresponding to a previously set pad clearance, and moves back the piston to the piston adjusted position when a brake instruction is issued by operating the brake pedal and then the brake instruction is retracted.

Furthermore, according to the invention, there is provided a method for adjusting the pad clearance of an electric brake, in which, if an ignition switch is turned from its off position to its on position, then an electric actuator is operated to thereby cause the present electric brake to generate a slight brake torque, a position of a piston to which the piston is moved back from the current position of the piston by an amount corresponding to a previously set pad clearance is set as the adjusted position of the piston, and, after then, if a brake instruction is issued by operating a brake pedal, then the present electric brake can be operated and, if the brake instruction is retracted, then the piston can be moved back to the piston adjusted position.

Moreover, the above-mentioned object can be attained by a method for adjusting the pad clearance of an electric brake, according to the present invention, comprising a main body; a piston movable within the main body for pressing a friction pad; ignition switch detecting member for detecting that an ignition key has been switched from its off position to its on position; brake instruction detecting member for detecting an operational condition of a brake pedal; a parking brake detecting member for detecting an operational condition of a parking brake; a piston position sensor for detecting a position of the piston within the main body of the electric brake; and an electric actuator for actuating the piston within the main body, the method comprising the steps of:

generating a slight brake torque of the electric brake by operating the electric actuator so as to move the piston onto an initial position when the ignition switch is turned from its off position to its on position; and setting a piston adjusted position of the piston by moving back the piston from the initial position of the piston by an amount corresponding to a previously set pad clearance.

In the above-mentioned method, it is preferable to further comprises:

moving back the piston to the piston adjusted position when a brake instruction is issued by operating a brake pedal and then the brake instruction is retracted.

In addition, in the above-mentioned method, the slight brake torque generating step preferably comprises the steps of:

detecting that the ignition key has been switched from its off condition to its on condition;

checking whether the parking brake device provided separately from the electric brake is in operation or not;

flowing into the electric actuator a constant current in an amount just enough for the electric brake to generate the slight brake torque; and calculating a position of the piston when the piston is moved by the electric actuator into which the constant current is being flown.

Further, in the above-mentioned method, the piston adjusted position setting step preferably comprises the steps of:

detecting whether the piston moved by the electric actuator is stopped or not;

setting thus stopped position of the piston as the initial position of the piston;

moving back the piston from the initial position by the amount corresponding to the predetermined pad clearance; and setting the position of the piston thus moved back as the piston adjusted position.

Furthermore, in the above-mentioned method for adjusting the pad clearance of an electric brake, the slight brake torque generating step preferably comprises the steps of:

detecting that the ignition key has been switched from its off condition to its on condition;

checking whether the parking brake device serving also as the electric brake is in operation or not;

checking whether the operation of the parking brake device is removed or not;

flowing into the electric actuator a constant current in an amount just enough for the electric brake to generate the slight brake torque; and calculating a position of the piston when the piston is moved by the electric actuator into which the constant current is being flown.

Moreover, in the above-mentioned method for adjusting the pad clearance of an electric brake, the piston adjusted position setting step preferably comprises the steps of:

detecting whether the piston moved by the electric actuator is stopped or not;

setting thus stopped position of the piston as the initial position of the piston;

moving back the piston from the initial position by the amount corresponding to the predetermined pad clearance; and setting the position of the piston thus moved back as the piston adjusted position.

DETAILED DESCRIPTION OF THE PREFERRED EMBODIMENTS

Now, description will be given below of embodiments of an electric brake including a pad clearance adjusting mechanism and a method for adjusting the pad clearance of the present electric brake according to the invention. In particular, FIG. 1 is a schematic view of the structure of an embodiment of an electric brake (electric disc brake) according to the invention, and FIG. 2 is an explanatory view of a current sensor which is composed of a resistor or the like employed in a brake control device shown in FIG. 1 and is used to calculate a brake torque.

Figure 1:
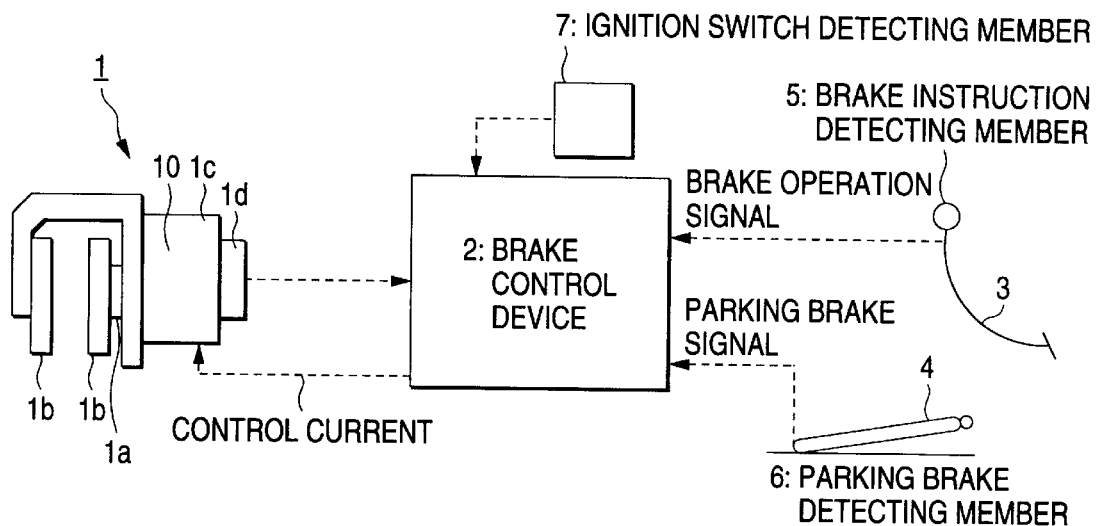
FIG. 1 is a schematic view of the structure of an embodiment of an electric brake according to the invention.
Figure 2:
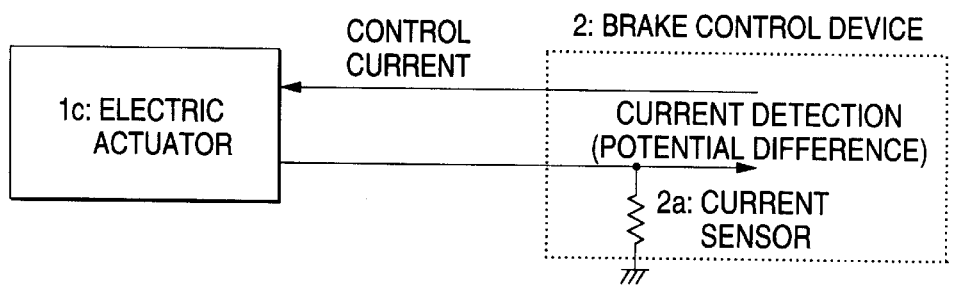
FIG. 2 is an explanatory view of an embodiment of a current detecting method employed in a brake control device included in the electric brake shown in FIG. 1.

In FIG. 1, reference character 1 designates an electric brake. The present electric brake 1 comprises a piston 1a, a brake pad 1b, an electric actuator 1c which is used to operate the piston 1a, and a piston position sensor 1d; and, the disc brake mechanism of the electric brake 1 is similar in structure to the conventional electric brake except for the piston position sensor 1d.

As the piston position sensor 1d, there can be used any type of sensor, if it has a function to detect the position of the piston within the main body 10 of the electric brake; for example, there can be used an encoder for detecting the number of rotations of a potentiometer or an electric actuator, and the like.

Reference character 2 designates a brake control device. As is conventionally known, the brake control device incorporates therein a program which not only executes a brake operation in accordance with a brake operation signal issued from brake instruction detecting member 5 which detects the operation condition of a brake pedal 3, but also executes various kinds of brake control operations such as an anti-lock control operation, a traction control operation, an automatic brake operation and the like in accordance with signals respectively sent from a wheel speed sensor, a vehicle-to-vehicle distance sensor and the like; that is, in accordance with the signals sent from various sensors, the brake control device 2 executes their respective brake control operations.

Also, the present brake control device 2, in addition to the above-mentioned function, incorporates therein a program which detects signals respectively issued from the piston position detecting member 1d, ignition switch detecting member 7 which is used to detect that an ignition switch has been turned from its off position to its on position, parking brake detecting member 6 which is used to detect the operation condition of a parking brake 4, and the like, and, in accordance with the signals applied from these detecting member, drives the electric actuator to thereby execute a pad clearance control operation to be described later; and, as shown in FIG. 2, the present brake control device 2 further includes a current sensor 2a such as a resistor or the like which is used to calculate a brake torque.

The above-mentioned current sensor 2a is able to measure a current flowing in the electric actuator 1c according to a potential difference between the electric actuator 1c and ground and, based on the thus measured or detected potential difference, the current sensor 2a calculates a brake torque according to a known technique within the brake control device 2.

Now, description will be given below of a method for adjusting the pad clearance of the thus structured electric brake with reference to first and second flow charts which are respectively shown in FIGS. 3 and 4.

Figure 3:
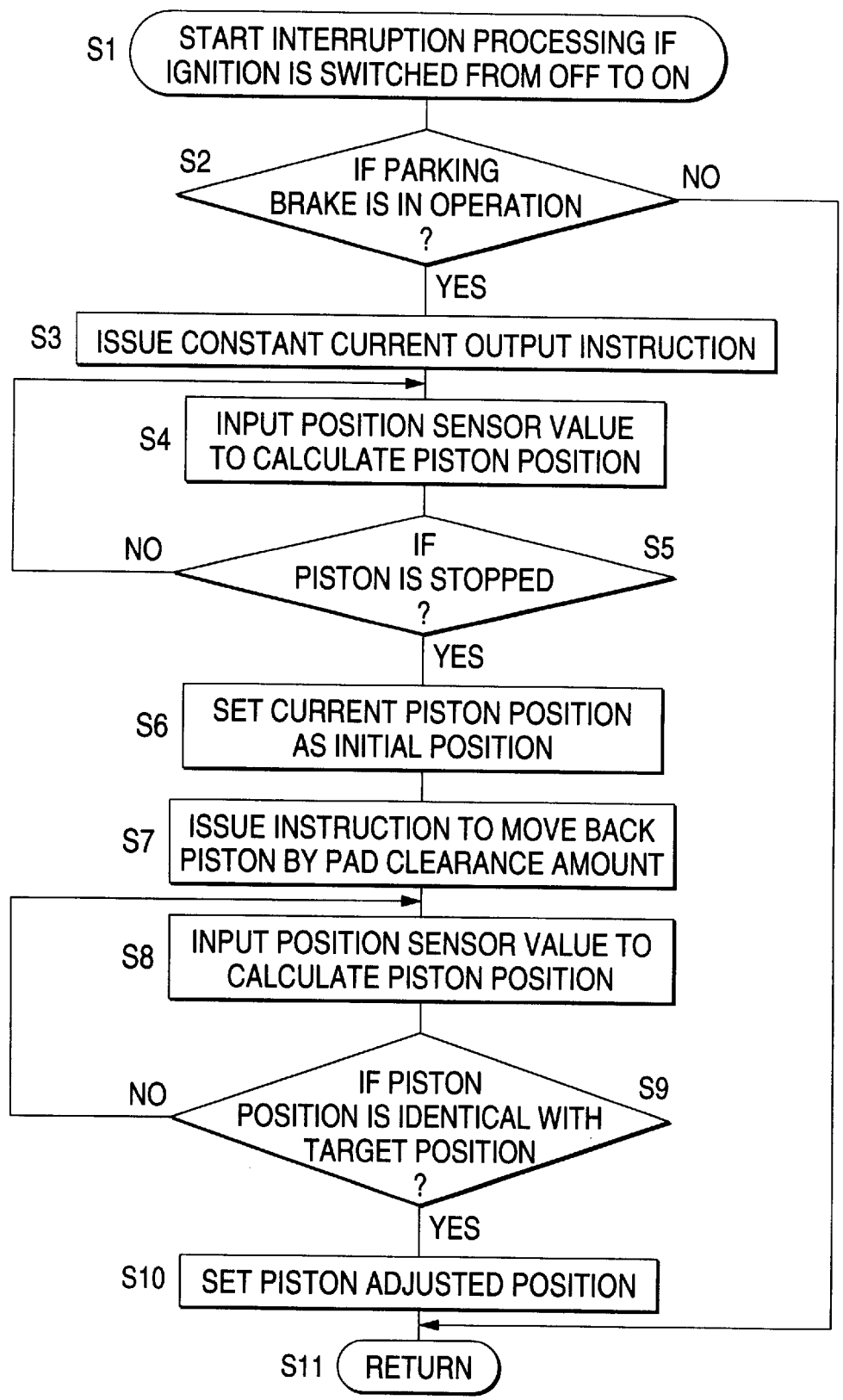
FIG. 3 is a first flow chart used to execute a pad clearance adjusting method according to the invention, the flow chart corresponding to a vehicle in which an electric brake and a parking brake are structured separately from each other.
Figure 4:
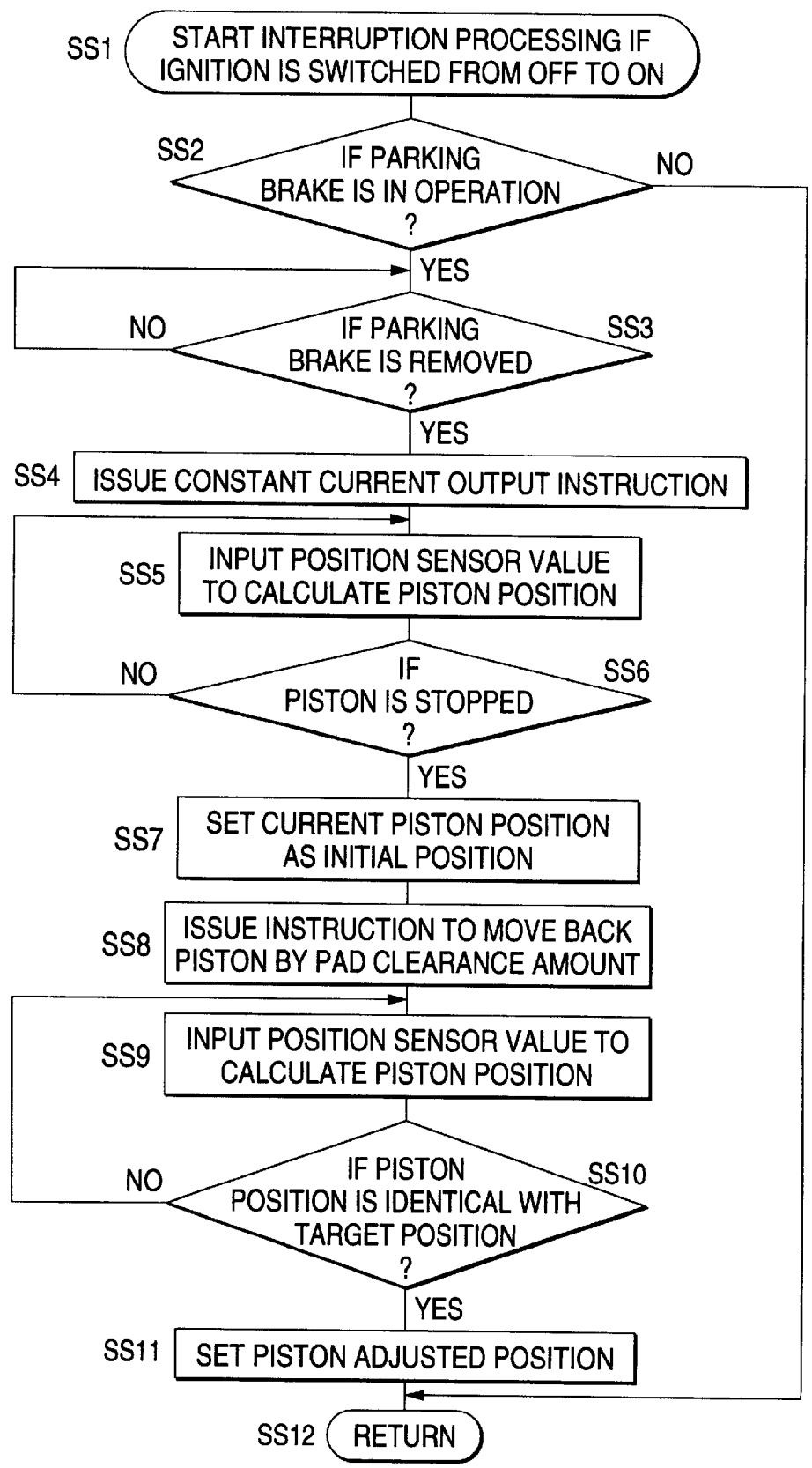
FIG. 4 is a second flow chart used to execute a pad clearance adjusting method according to the invention, the flow chart corresponding to a vehicle in which an electric brake and a parking brake are combined as a single brake.

In particular, FIG. 3 shows a first flow chart for the pad clearance adjusting method to be executed within the brake control device 2, and FIG. 4 shows a second flow chart for the pad clearance adjusting method to be executed within the brake control device 2.

At first, describing the first flow chart with reference to FIG. 3, the present flow chart corresponds to a vehicle which includes a parking brake device 4 provided separately from the electric brake 1.

Specifically, in Step S1, firstly, if the ignition switch detecting member 7 detects that the ignition key has been switched from its off condition to its on condition, then an interruption processing program is started.

In Step S2, it is checked from a signal sent from the parking brake detecting member 6 whether the parking brake device provided separately from the electric brake is in operation or not. If it is found that the parking brake device is not in operation, then the procedure advances to "Return" in Step S11, thereby ending the interruption processing program. That is, the present step S2 prevents a malfunction due to the engine breakdown in the starting time of the vehicle and also avoids the occurrence of a brake dragging feeling in the early stage of the starting time of the vehicle.

In Step S2, if it is found that the parking brake device is in operation, then the procedure advances to Step S3, in which a constant current in an amount just enough for the electric brake to generate a slight brake torque is allowed to flow into the electric actuator 1c (constant current output instruction). In Step S3, a current is controlled in accordance with a signal sent from a current sensor 2a shown in FIG. 2, and the electric actuator 1c is driven, thereby generating a slight brake torque. In Step S4, a detection value from the piston position sensor 1d including an electric actuator is input to thereby calculate the position of a piston.

In Step S5, the piston position sensor 1d detects whether the piston is stopped or not, in other words, the sensor 1d detects whether the input brake torque and the calculated piston position balance well or whether the position of the piston has been changed or not. In Step S6, the current position of the piston is set as the initial position of the piston. In Step S7, there is issued an instruction to move back the piston from the piston initial position set in Step S6 by an amount corresponding to a pad clearance; in Step S8, a detection value from the piston position sensor 1d is input to thereby calculate the piston position; and, in Step S9, it is checked whether the piston position is coincident with a target position or not. If it is found that the piston position is coincident with the target position, then the procedure advances to Step S10, in which the thus found piston position is set as the piston adjusted position, and the procedure further advances to Step S11, in which the present program is ended. After then, if a brake instruction is issued by operating a brake pedal, then the electric brake can be operated and, if the brake instruction is retracted, then the piston is moved back to the above-mentioned piston adjusted position, which makes it sure to be able to obtain a constant pad clearance.

As described above, in the present flow chart, in the vehicle which includes a parking brake device provided separately from an electric brake, the present program is always executed only when the parking brake device is in operation. This not only prevents a malfunction or the like due to the engine breakdown during the running time of the vehicle to thereby enhance the safety of the present electric brake and thus the vehicle, but also can surely avoid the possibility of the brake being dragged when the vehicle starts.

Now, description will be given below of the second flow chart with reference to FIG. 4. The present flow chart corresponds to a vehicle in which the electric brake 1 and parking brake device 4 are combined together into a single brake device.

In Step SS1, firstly, if the ignition switch detecting member 7 detects that the ignition key has been switched from its off condition to its on condition, then an interruption processing program is started.

Next, in Step SS2, it is checked from a signal sent from the parking brake detecting member 6 whether the parking brake device 4 serving also as an electric brake is in operation or not. If it is found that the parking brake device 4 is not in operation, then the procedure advances to "Return" in Step SS12, in which the interruption processing program is ended.

On the other hand, if it is found in Step SS2 that the parking brake device 4 is in operation, then the processing advances to Step SS3, in which it is checked whether the operation of the parking brake device is removed or not. That is, only when the operation of the parking brake device is removed, Step SS4 and its following steps are to be executed. The reason for this is as follows: when the parking brake device also serves as the electric brake, the position of the piston when the parking brake device is in operation is always variable and thus the initial position of the piston cannot be set by member of a constant current output and, therefore, the present program is to be executed only when the operation of the parking brake device is removed.

If the operation of the parking brake device is removed, then the processing advances to Step SS4, in which a constant current in an amount just enough for the electric brake to generate a slight brake torque is allowed to flow into the electric actuator 1c (constant current output instruction). In Step SS4, a current is controlled in accordance with a signal issued from a current sensor 2a shown in FIG. 2 and the electric actuator 1c is driven, so that a slight brake torque is generated. In Step SS5, a detection value applied from the piston position sensor 1d including an electric actuator is input to thereby calculate the position of a piston.

In Step SS6, the piston position sensor 1d detects whether the piston is stopped or not, in other words, the sensor 1d detects whether the input brake torque and the calculated piston position balance well or whether the position of the piston has been changed or not. In Step SS7, the current position of the piston is set as the initial position of the piston. In Step SS8, there is issued an instruction to move back the piston from the piston initial position set in Step SS7 by an amount corresponding to a pad clearance; in Step SS9, a detection value applied from the piston position sensor 1d is input to thereby calculate the piston position; in Step SS10, it is checked whether the piston position is coincident with a target position or not. If it is found that the piston position is coincident with the target position, then the procedure advances to Step SS11, in which the thus found piston position is set as the piston adjusted position, and the procedure further advances to Step SS12, in which the present program is ended. After then, if a brake instruction is issued by operating a brake pedal, then the electric brake can be operated and, if the brake instruction is retracted, then the piston is moved back to the above-mentioned piston adjusted position, so that a constant pad clearance can be obtained.

According to the present flow chart, due to the fact that, when the parking brake device also serves as the electric brake, the position of the piston when the parking brake device is in operation is always variable and thus the initial position of the piston cannot be set by member of a constant current output, the adjustment of the pad clearance of the electric brake is to be executed only when the parking brake device removed.

As described above, in the electric brake incorporating therein a pad clearance adjusting method according to the invention, various kinds of brake control operations can be executed similarly to the conventional electric brake device, and also the pad clearance can be adjusted automatically so that the optimum brake force can be always obtained and thus the safety of the electric brake and thus the vehicle can be enhanced.

Also, since the pad clearance adjustment can be executed by incorporating a pad clearance adjusting program into the brake control device which has been conventionally used, the cost of the present electric brake does not increase so much. By the way, as the brake device, in the above-mentioned embodiment, description has been given mainly of a brake device of a caliper type. However, of course, other kinds of brake devices can also use the brake control device which incorporates the present program therein. Also, according to the invention, it goes without saying that other various modifications can also be enforced without departing from the scope of the appended patent claims and the essential characteristic matters of the invention.

As has been described above in detail, according to the invention, if the ignition key is switched from its off position to its on position, then there can flow a constant current in an amount just enough for the electric brake to generate a slight brake torque, the thus generated slight brake torque is used to find the piston position that balances well with the slight brake torque, a position to which the piston is moved back from the thus found piston position by an amount corresponding to a preset pad clearance is set as the adjusted position of the piston, and, when a brake operation is ended, then the piston is always moved back to the piston adjusted position, thereby being always able to obtain a constant pad clearance. Due to the constant pad clearance, even if the brake pad of the electric brake is worn, there can be obtained a stable brake feeling. Also, by changing the program within the brake control device, the pad clearance adjustment according to the invention is able to cope with various kinds of electric brakes, while the present electric brake can be carried on board the vehicle at a low cost and with ease.

What is claimed is:

1. An electric brake including a pad clearance adjusting mechanism, said electric brake comprising:

a main body (10);

a piston (1a) movable within said main body (10) for pressing a friction pad (1b);

ignition switch detecting member (7) for detecting that an ignition key has been switched from its off position to its on position;

brake instruction detecting member (5) for detecting an operational condition of a brake pedal (3);

a parking brake detecting member (6) for detecting an operational condition of a parking brake (4);

a piston position sensor (1d) for detecting a position of said piston within said main body (10) of said electric brake (1), an electric actuator (1c) for actuating said piston (1a) within said main body; and a brake control device (2) for automatically adjusting a pad clearance, wherein said brake control device generates a slight brake torque of said electric brake by operating said electric actuator so as to move said piston onto an initial position, when said ignition switch is turned from its off position to its on position, sets a piston adjusted position of said piston by moving back said piston from said initial position by an amount corresponding to a previously set pad clearance, and moves back said piston to said piston adjusted position when a brake instruction is issued by operating said brake pedal and then said brake instruction is retracted.

2. A method for adjusting the pad clearance of an electric brake comprising a main body (10); a piston (1a) movable within said main body (10) for pressing a friction pad (1b); ignition switch detecting member (7) for detecting that an ignition key has been switched from its off position to its on position; brake instruction detecting member (5) for detecting an operational condition of a brake pedal (3); a parking brake detecting member (6) for detecting an operational condition of a parking brake (4); a piston position sensor (1d) for detecting a position of said piston within said main body (10) of said electric brake (1); and an electric actuator (1c) for actuating said piston (1a) within said main body, said method comprising the steps of:

generating a slight brake torque of said electric brake by operating said electric actuator so as to move said piston onto an initial position when said ignition switch is turned from its off position to its on position; and setting a piston adjusted position of said piston by moving back said piston from said initial position of said piston by an amount corresponding to a previously set pad clearance.

3. The method for adjusting the pad clearance of an electric broke according to claim 2, further comprising:

moving back said piston to said piston adjusted position when a brake instruction is issued by operating a brake pedal and then said brake instruction is retracted.

4. The method for adjusting the pad clearance of an electric brake according to claim 2, wherein said slight brake torque generating step comprises the steps of:

detecting that said ignition key has been switched from its off condition to its on condition;

checking whether said parking brake device provided separately from the electric brake is in operation or not;

flowing into said electric actuator a constant current in an amount just enough for said electric brake to generate said slight brake torque; and calculating a position of said piston when said piston is moved by said electric actuator into which said constant current is being flown.

5. The method for adjusting the pad clearance of an electric brake according to claim 4, wherein said piston adjusted position setting step comprises the steps of:

detecting whether said piston moved by said electric actuator is stopped or not;

setting thus stopped position of said piston as said initial position of the piston;

moving back said piston from said initial position by said amount corresponding to said predetermined pad clearance; and setting the position of said piston thus moved back as said piston adjusted position.

6. The method for adjusting the pad clearance of an electric brake according to claim 2, wherein said slight brake torque generating step comprises the steps of:

detecting that the ignition key has been switched from its off condition to its on condition;

checking whether said parking brake device serving also as the electric brake is in operation or not;

checking whether the operation of said parking brake device is removed or not;

flowing into said electric actuator a constant current in an amount just enough for said electric brake to generate said slight brake torque; and calculating a position of said piston when said piston is moved by said electric actuator into which said constant current is being flown.

7. The method for adjusting the pad clearance of an electric brake according to claim 6, wherein said piston adjusted position setting step comprises the steps of:

detecting whether said piston moved by said electric actuator is stopped or not;

setting thus stopped position of said piston as said initial position of the piston;

moving back said piston from said initial position by said amount corresponding to said predetermined pad clearance; and setting the position of said piston thus moved back as said piston adjusted position.

* * * * *